United States Patent [19]
Hsiesh

[11] Patent Number: 5,672,939
[45] Date of Patent: Sep. 30, 1997

[54] MOIRE CONTROL OF A COLOR DISPLAY DEVICE

[76] Inventor: Chang Fa Hsiesh, No. 6, Feng Shu Tsuen, Kweishan, Taoyuan, Taiwan

[21] Appl. No.: 552,134

[22] Filed: Nov. 2, 1995

[51] Int. Cl.$^6$ .................................................. H04N 5/21
[52] U.S. Cl. ............................................. 315/1; 315/382.1
[58] Field of Search ...................................... 315/370, 382, 315/382.1, 1; 348/806, 189, 177

[56] References Cited

U.S. PATENT DOCUMENTS 5,430,502  7/1995  Yamazaki et al. ................... 315/370 X
5,440,353  8/1995  Yamazaki et al. ................ 315/382.1 X

OTHER PUBLICATIONS

Millman, J., *Microelectronics: Digital and Analog Circuits and Systems*, McGraw–Hill, Inc., 1979, p. 573.

Primary Examiner—Robert Pascal
Assistant Examiner—Justin P. Bettendorf
Attorney, Agent, or Firm—Fish & Richardson P.C.

[57]  ABSTRACT

The present invention provides a horizontal (H) position modulator circuit for adjusting the horizontal impingement location of the electronic beam of a predetermined scan line and a vertical (V) position modulator circuit for adjusting the vertical impingement location of the electronic beam of a predetermined scan field. The H-position modulator, which is coupled to the H-position control circuit existing in the conventional color display device, responsive to the H-MOIRE control signal, changes the relative timing relation of horizontal synchronization signal to the video signals via the horizontal deflection circuit. The H-positions of electronic beam impingement of the predetermined scan lines are therefore adjusted. The V-position modulator, which is coupled to the V-position control circuit existing in the conventional color display device, responsive to the V-MOIRE control signal, changes the current flowing through the vertical deflection coil. The V-positions of electronic beam impingement of the predetermined scan field are therefore adjusted.

3 Claims, 2 Drawing Sheets

MOIRE CONTROL OF A COLOR DISPLAY DEVICE

TECHNICAL FIELD OF INVENTION

This invention relates to the color display device and, in particular, to the MOIRE control of the color display device.

BACKGROUND OF THE INVENTION

In the field of color display device, it is well known that color image is created by directing the electron beam of respective intensity from Red (R), Green (G) and Blue (B) electronic guns to shoot the corresponding phosphor dot on the inner surface of the color cathode ray tube (CRT). In modern CRT technology, in-line electronic guns and in-line R, G, B phosphor dots have been widely used. A set of one R, G and B phosphor dot constitutes a basic color image. Typically, the pitch of the phosphor dot ranges from 0.2 to 0.4 mm. The emitted electronic beam of a particular gun, e.g. Red gun, is only permitted shooting on the corresponding, e.g. red, phosphor dot. Therefore, a shadow mask is provided and located right before the inner surface of CRT. On the shadow mask, a plurality of holes are provided and arranged in the same pattern as that of the phosphor dots. Through this implementation, the electronic beam of the Red gun, for instance, does not shoot on the phosphor dot of Green or Blue color. However, due to various physical or chemical factors during manufacturing or utilization of the CRT, the above requirement, which is met theoretically by the introduction of the shadow mask, is not met in actual use of CRT. When this is happened, the overall color image created does not track with the original one accurately and this phenomenon has been named as MOIRE phenomenon in this field. The factors mentioned include the manufacturing imperfection of the shadow mask, the dimension of the phosphor dot being out of tolerance or thermal expansion of the shadow mask resulted from the impingement of the electronic beam.

SUMMARY OF INVENTION

It is, therefore, the main object of the invention to modulate the actual impingement location of the electronic beam of a predetermined scan lines or scan field on the phosphor dot such that MOTRE phenomenon is improved.

The present invention provides a horizontal (H) position modulator circuit for adjusting the horizontal impingement location of the electronic beam and a vertical (V) position modulator circuit for adjusting the vertical impingement location of the electronic beam of a predetermined scan line. The microcontroller within the color display device, responsive to the MOIRE adjustment command from the user, sends a H-MOIRE control signal and a V-MOIRE control signal to the H-position and V-position modulators respectively.

The H-position modulator, which is coupled to the H-position control circuit existing in the conventional color display device, responsive to the H-MOIRE control signal, changes the relative timing relation of horizontal synchronization signal to the video signals via the horizontal deflection circuit. The H-positions of electronic beam impingement of the predetermined scan lines are therefore adjusted.

The V-position modulator, which is coupled to the V-position control circuit existing in the conventional color display device, responsive to the V-MOIRE control signal, changes the current flowing through the vertical deflection coil. The V-positions of electronic beam impingement of the predetermined scan field are therefore adjusted.

DETAILED DESCRIPTION OF THE INVENTION

Figure 1:
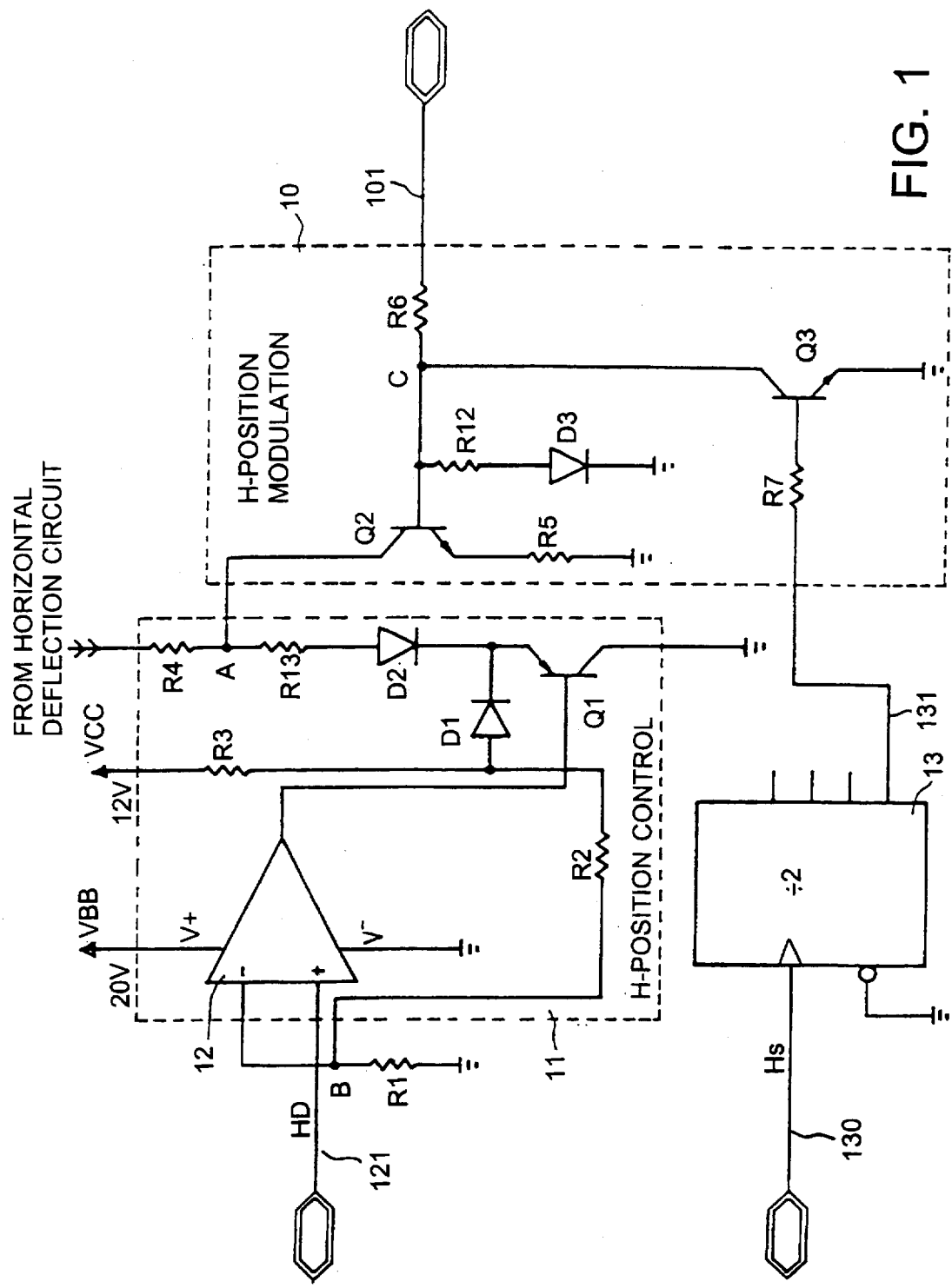
FIG. 1 shows the H-position modulator circuit together with the associated circuits in accordance with the invention.

As shown in FIG. 1, the invention provides a H-position modulation circuit 10 coupled to the H-position control circuit 11 at the terminal A. The H-position control circuit 11, as well known in the art, includes an operational amplifier 12 having a noninverting input terminal receiving the horizontal position adjustment analog signal 121 coming from a microcontroller within the color display device (not shown). The inverting input of operational amplifier 12 is coupled to a terminal B of a voltage divide circuit which includes resistors R1, R2, R3. The output voltage of the operational amplifier 12 is supplied to the base (B) of the transistor Q1. The emitter (E) of the transistor Q1 is connected to one terminal of the horizontal deflection circuit (not shown) via resistors R4, R13 and diode D2 for sinking current therefrom. Furthermore, the emitter of transistor Q1 is connected to one voltage-divider terminal via diode D1 as shown. As commercially available LA7850 IC is employed as the preferred embodiment of the horizontal deflection circuit, pin 2 of this IC is connected to the emitter of the transistor Q1 via resistors R4, R13 and diode D2. It is well known in the art, as the magnitude of analog signal 121 changes, the voltages at the inverting input (terminal B) follows in response, and, therefore, the voltage at the emitter of transistor Q1 changes as a result. Accordingly, the current sunk by the transistor Q1 from the pin 2 of LA7850 IC varies in response. The variation of the sinking current from pin 2 of LA7850 IC changes the timing of the horizontal synchronization signal relative to the video signals. Therefore, the horizontal position of the video signals relative to the horizontal synchronization signal is changed.

When one horizontal position is chosen, the actual impingement horizontal location of electronic beam on the phosphor dot can be micro-adjusted by a H-position modulation circuit 10 of the invention. The H-position modulation circuit 10 includes a transistor Q2 having its emitter connected to ground via resistor R5. The base of the transistor Q2 is adapted to receive the H-MOIRE control signal 101 from the microcontroller within the color display device mentioned above. The collector of transistor Q2 is connected to the terminal A of the H-position control circuit 11. At the terminal C, a DC voltage is built up which corresponds to the value of the H-MOIRE control signal 101. The H-position modulation circuit 10 also includes a switch transistor Q3 having the collector connected to the terminal C and the emitter connected to ground. The base of the transistor Q3 is adapted to receive the output signal 131 of a divide-by-2 counter 13 via the resistor R7. This counter may be implemented by commercially available 54HC393 chip. The data terminal of counter 13 is connected to ground and the clock terminal of the counter 13 receives the horizontal synchronization signal 130. Each time output signal 131 is activated, switch transistor Q3 is turned ON to pull the voltage at the terminal C to ground. As a result, the voltage at the terminal C oscillates between a DC voltage and ground at one-half frequency of the horizontal synchronization signal. When the voltage of the terminal C is grounded, the transistor Q2 is OFF and no current is sunk from terminal A and, thus, no current flows through resistor R5. While the voltage of the terminal C is equal to the DC voltage, the transistor Q2 is ON and a current I is sunk from terminal A and flows through resistor R5. It is this extra current I which causes additional, either in positive direction or negative direction, changes of the relative timing relation of the horizontal synchronization signal to the video signals, other than the influence of the horizontal position adjustment signal 121. The amount of current I flowing through the resistor R5 is a function of voltage value at the base terminal of transistor Q2, which, in turn, is the function of the H-MOIRE control signal 101. Since a divide-by-2 counter is used, the H-MOIRE modulation circuit is activated for electronic beams of either odd-number horizontal scan lines or even-number horizontal scan lines.

Figure 2:
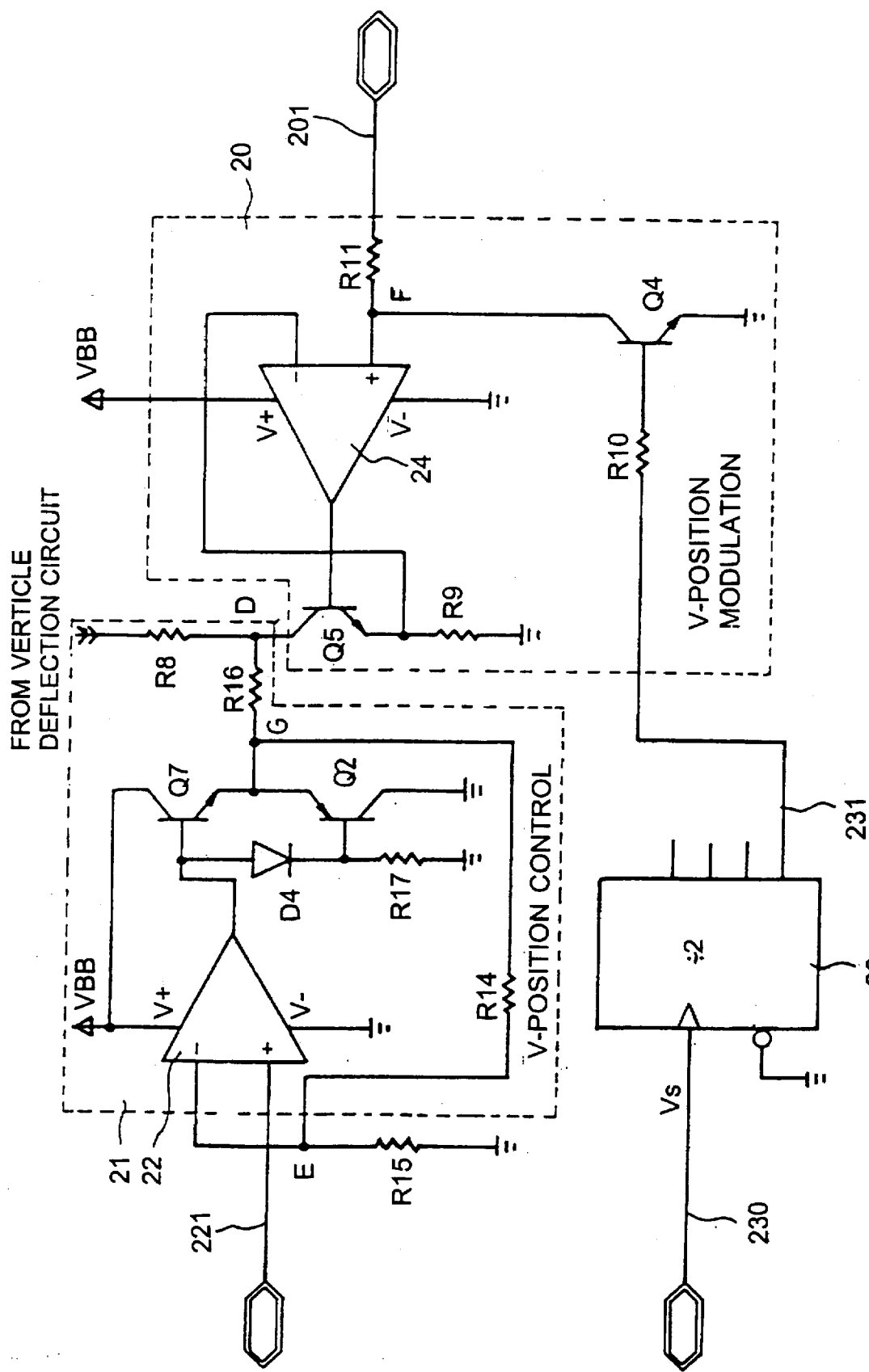
FIG. 2 shows the V-position modulator circuit together with the associated circuits in accordance with the invention.

As shown in FIG. 2, the invention provides a V-position modulation circuit 20 coupled to the V-position control circuit 21 at the terminal D. The V-position control circuit 21, as well known in the art, includes an operational amplifier 22 having a noninverting input terminal receiving the vertical position adjustment analog signal 221 coming from the microcontroller mentioned above. The inverting input of operational amplifier 22 is coupled to a terminal E of a voltage divider circuit which includes resistors R15, R14, R16. The output voltage of the operational amplifier 22 is supplied to the base of the transistor Q7. And via diode D4, the output voltage is also supplied to the base of the transistor Q6. The emitter of the transistor Q7 is connected to the emitter of the transistor Q6 at the voltage divider terminal G as shown. The output voltage of the operational amplifier 22 is such that as transistor Q7 is ON, the transistor Q6 is OFF, and vice versa. It is well known in the art, as the magnitude of signal 221 is such that turns the transistor Q7 ON, current flows from VBB through transistor Q7, resistor R16, R8 to the vertical deflection coil (not shown). To the contrary, as the magnitude of signal 221 is such that turns the transistor Q6 ON, current flows from the vertical deflection coil through resistor R8, R16 and transistor Q6 to ground. While the transistor Q7 is ON, variation of the current through the transistor Q1, which is caused by a corresponding voltage change at the terminal G responsive to variation of the magnitude of signal 221, moves the vertical position of entire raster in one direction. While the transistor Q6 is ON, variation of the current through the transistor Q6, which is caused by a corresponding voltage change at the terminal G responsive to variation of the magnitude of signal 221, moves the vertical position of entire raster in another direction.

When one vertical position is chosen, the actual impingement vertical location of electronic beam on the phosphor dot can be micro-adjusted by a V-position modulation circuit 20 of the invention. The V-position modulation circuit 20 includes a transistor Q5 having its emitter connected to ground. The base of the transistor Q5 is adapted to receive the output signal of an operational amplifier 24. The non-inverting input terminal of the operational amplifier 24 receives the V-MOIRE control signal 201 coming from the microcontroller within the color display device. The inverting input terminal of the operational amplifier 24 connects to the emitter of transistor Q5. The collector of transistor Q5 is connected to the terminal D of the V-position control circuit 21. At the terminal F, a DC voltage is built up which corresponds to the value of signal 201. The V-position modulation circuit 20 also includes a switch transistor Q4 having the collector connected to the terminal F and the emitter connected to ground. The base of the transistor Q4 is adapted to receive the output signal 231 of a divide-by-2 counter 23 via the resistor R10. This counter may be implemented by commercially available 54HC393 chip. The data terminal of counter 23 is connected to ground and the clock terminal of the counter 23 receives the vertical synchronization signal 230. Each time output signal 231 is activated, switch transistor Q4 is turned ON to pull the voltage at the terminal F to ground. As a result, the voltage at the terminal F oscillates between the DC voltage and ground at one-half frequency of the vertical synchronization signal 230. When the voltage of the terminal F is grounded, the output of operational amplifier 24 turns off the transistor Q5 and no current is sunk from terminal D. While the voltage of the terminal F is equal to the DC voltage, the output of operational amplifier 24 turns on the transistor Q5 and a current I is sunk from terminal D and flows through resistor R9. It is this extra current I which causes additional, either in positive direction or negative direction, changes of the vertical position of the raster, other than the influence of the vertical position adjustment signal 221. It is well known in the art, as the signal 201 changes, the voltage at emitter of transistor Q5 changes in response, and accordingly, the current I sunk by the transistor Q5 from terminal D varies in response. The amount of current I flowing through the resistor R9 is a function of voltage difference between emitter and base of transistor Q5, which, in turn, is the function of the V-MOIRE control signal 201. Since the divide-by-2 counter is used, the V-position modulation circuit 20 is activated for electronic beams of either odd-number field or even-number field.

Although the shown embodiment uses a divide-by-2 counter, it is to be noted, within the spirit of the present invention, the object of the invention may be achieved by any divide-by-2N counter, wherein N is an integer.

I claim:

1. A video circuit for a color cathode ray tube which has an inner surface and a plurality of phosphors dots thereon and on which an electric beam is selectively impinged for generating image, responsive to a video signal, against a raster, the video circuit being coupled to a horizontal deflection circuit, comprising:

a divide-by-2N circuit for generating an activation signal, responsive to a horizontal synchronization signal, N being an integer;

a horizontal position control circuit having an input terminal adapted to receive a horizontal position control signal for controlling horizontal position of said image relative to the raster, said horizontal position control circuit having a terminal coupled to the horizontal deflection circuit for sinking current therefrom and for changing timing of the horizontal synchronization signal relative to the video signal;

a horizontal position modulation circuit coupled to said horizontal position control circuit at said current-sinking terminal for micro-adjusting horizontal impingement position of electric beam of a predetermined horizontal scan lines relative to the phosphors dots, responsive to am H-MOIRE control signal and the activation signal, wherein the horizontal position modulation circuit comprises a transistor having an emitter connected in a DC path to ground via a resistor, a base of said transistor is adapted to receive the H-MOIRE control signal, a collector of said transistor is connected to said current-sinking terminal, the horizontal position modulation circuit further includes a switch transistor having a collector connected to the base of said transistor, an emitter connected to ground, and a base, the base of the switch transistor is adapted to receive the activation signal.

2. The video circuit of claim 1 wherein the collector of said transistor of said horizontal position modulation circuit is connected in a DC path to said current sinking terminal.

3. A video circuit for a color cathode ray tube which has an inner surface and a plurality of phosphors dots thereon and on which an electric beam is selectively impinged for generating image, in response to a video signal, against a raster, the video circuit being coupled to a horizontal deflection circuit, comprising:

a divide-by-2N circuit for generating an activation signal, responsive to a horizontal synchronization signal, N being an integer;

a horizontal position control circuit having an input terminal adapted to receive a horizontal position control signal for controlling horizontal position of said image relative to the raster, said horizontal position control circuit having a terminal coupled to the horizontal deflection circuit for sinking current therefrom and for changing timing of the horizontal synchronization signal relative to the video signal;

a horizontal position modulation circuit coupled to said horizontal position control circuit at said current-sinking terminal, the horizontal position modulation circuit, responsive to an H-MOIRE control signal and the activation signal, micro-adjusting horizontal impingement position of electric beam of a predetermined horizontal scan line relative to the phosphorus dots.

* * * * *